United States Patent [19]

Heutink

[11] Patent Number: 5,163,048
[45] Date of Patent: Nov. 10, 1992

[54] TWO-WIRE EXTENDED SERIAL BUS COMMUNICATIONS SYSTEM WITH COLLECTIVE ECHOING OF DATA TRANSMITTED FROM PERIPHERAL STATIONS

[75] Inventor: Frederick H. Heutink, Eindhoven, Netherlands

[73] Assignee: U.S. Philips Corp., New York, N.Y.

[21] Appl. No.: 500,611

[22] Filed: Mar. 27, 1990

[30] Foreign Application Priority Data

Apr. 3, 1989 [GB] United Kingdom ............... 89200847

[51] Int. Cl.$^5$ .............................................. H04J 3/02
[52] U.S. Cl. ................................... 370/85.6; 370/85.1; 370/94.1; 340/825.51
[58] Field of Search ....................... 370/85.6, 60, 85.1, 370/94.1, 108, 84, 85.2, 85.13, 100.1, 85.11, 85.12, 85.9; 340/825.51, 825.50; 455/4, 88; 375/36, 38, 110

[56] References Cited

U.S. PATENT DOCUMENTS

| | | | |
|---|---|---|---|
| 4,740,956 | 4/1988 | Hailpern et al. ................... | 370/85.2 |
| 4,811,367 | 3/1989 | Tajika ................................. | 370/108 |
| 4,868,812 | 9/1989 | Krüger et al. ..................... | 370/85.1 |
| 4,888,764 | 12/1989 | Haug ................................. | 370/85.1 |
| 4,993,023 | 2/1991 | Phinney ............................. | 370/85.13 |
| 5,033,045 | 7/1991 | Ramel et al. ..................... | 370/85.13 |
| 5,051,940 | 9/1991 | Kato ................................. | 370/100.1 |

OTHER PUBLICATIONS

"The Serial Bus of the IEC 821 Bus", IEC Subcommittee 47B/28, draft C2, Dec. 1, 1986, IEC, 3 Rue de Varembe, 1211, Geneva 20, Switzerland.

Primary Examiner—Douglas W. Olms
Assistant Examiner—Dang T. Ton
Attorney, Agent, or Firm—Jack D. Slobod

[57] ABSTRACT

In a communication bus system all data is echoed by a common echo buffer station on a first bilevel unidirectional element or wire, in the form of sequential self-clocked bivalent information packets. Peripheral stations have clock extraction provisions for clocked interrogation of those packets, absorbing the information if required, and thereupon transmitting a self-determined non-selfclocked binary information value on a second bilevel unidirectional element or wire that has a wired-logic functionality (wired-OR, wired-AND) so that coexistently transmitting peripheral stations may be subjected to arbiter operation. A peripheral station may have clock extraction means and transfer the extracted clock on a third wire, in parallel with unclocked data on a fourth wire, third and fourth wire in parallel feeding a plurality of access modules. Any access module may then feed a fifth wire with its data, all fifth wires in parallel feeding the second wire via associated bridge elements.

14 Claims, 5 Drawing Sheets

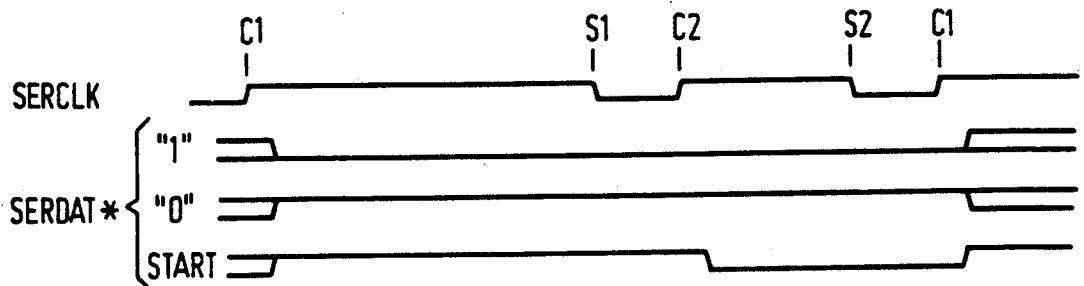
FIG.1a (PRIOR ART)
FIG.1b (PRIOR ART)
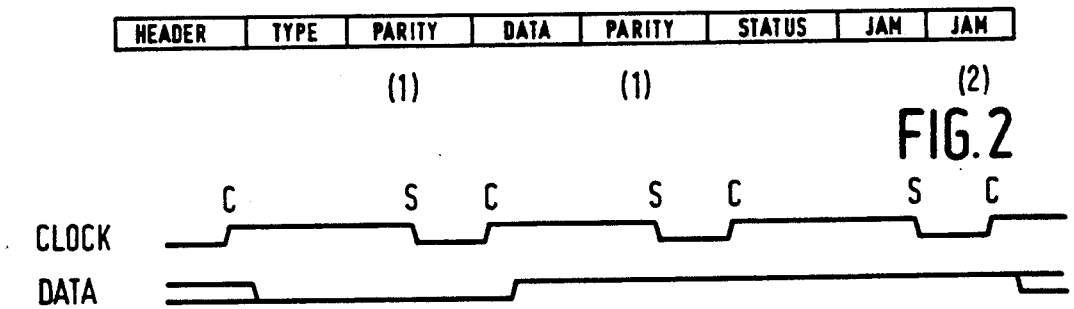
FIG.2
FIG.3
FIG.4a
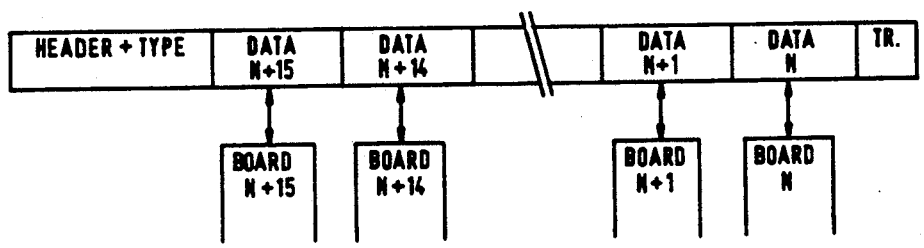
FIG.4b

| PRIORITY LEVEL | TRANSMISSION SEQUENCE |
|---|---|
| 2 | 5 4 - 5 4 - 5 4 - 5 4 - 5 4 - 5 4 - 5 4 - 5 |
| 1 | 3     2     -     3     2     -     3 |
| 0 |             1                   -* |

TWO-WIRE EXTENDED SERIAL BUS COMMUNICATIONS SYSTEM WITH COLLECTIVE ECHOING OF DATA TRANSMITTED FROM PERIPHERAL STATIONS

BACKGROUND OF THE INVENTION

The invention relates to a two-wire extended serial bus communication system provided with a synchronizing mechanism. In real-time applications of the well-known VME-bus organization, an extensive and versatile I/O system is essential. The maximum configuration of such a system should be capable of handling more inputs and outputs than can be fitted into one VME-bus rack. The powerful functionally and high performance of the VME-bus interface logic and backplane usually are not needed by the I/O system, and hence much of the cost and complexity of these provisions is wasted. When a large number of inputs and outputs is desired, a serial organization would be preferred.

SELECTED PRIOR ART DESCRIPTION

A well-known serial bus organization is the so-called VMS-bus described in —The serial bus of the IEC 821 bus—, IEC subcommittee 47B/28, draft C2, Dec. 1, 1986, IEC, 3, Rue de Varembé, 1211, Geneva 20, Switzerland. A brief explanation of the VMS-bus is presented with respect to FIGS. 1a, 1b, that illustrate various definition aspects of the VMS-bus.

The VMS-bus is a serial bus containing a unidirectional clock line and a bidirectional data line. Data exchanges occur in units called "frames" on the data line; the separate clock line provides synchronization for individual bits within the frame. A normal frame consists of header, type code, data field, status field and single jam bit. FIG. 1a gives the normal shape thereof, with the respective numbers of bits given in parentheses. The header contains a start bit, priority code, sender address and receiver address (identifying the source and destination, respectively, of the data in the data field), and two control bits (D/H in FIG. 1)—one to specify the behaviour of the "data senders" in case more than one is selected; and the other to validate the header. The type code indicates the length of the data field: 0, 1, 2, 4, 8, 16, or 32 bytes or "cancelled" (i.e., the data buffer of either the "data sender" or the "data receiver" is not available at the moment). The status field indicates whether there are modules on the bus which recognize the sender address or the receiver address as their own, and whether they have data buffers of the required size. The jam bit (normally "0") provides for detection of faulty frame synchronization between modules: if a module detects the occurrence of a start bit while a frame is in progress, it generates a continuous sequence of -ones-, longer than any possible frame. All modules see a "1" in the jam bit position, reject the frame, and wait until the end of the jam sequence before starting a new frame.

The VMS-bus has a distributed arbitration mechanism based on a "wired-OR" function performed by the data line. Any module that attempts to place a "0" on the data line in a particular bit position and notices that the data line becomes "1" concludes that it has lost the arbitration procedure and hence withdraws from the bus. Thus, if a number of modules start a frame at the same time, only the module(s) with the highest priority survive the arbitration within the priority field. If there is more than one module with this priority, only the one with the highest sender address survives the next part of the arbitration. And so on if necessary.

Within a single rack, the VMS-bus runs along two tracks of the backplane: SERCLK and SERDAT*. Herein, the asterisk is understood to indicate the inverted signal value. Now, the backplane may contain up to 21 boards, each with a VMS-bus interface called an "access module". Up to 32 racks may be linked by the "Extended VMS-bus". This link consists of two twisted-pair transmission lines carrying the signal EXTCLK and EXTDAT, according to the EIA RS-485 standard. A "bridge" element is required at every point that a rack is connected to the Extended VMS-bus, in order to convert EXTCLK to SERCLK and EXTDAT to SERDAT*. The bridge element is completely transparent; access modules may participate in the arbitration procedure and in the remainder of the frame, independent of where in the Extended system they are located.

Access modules are allowed to start a new frame only when there is no frame in progress. All modules are obliged, therefore, to keep track of the progress of each frame on the bus, even if they are not actively participating in the frame. In order to provide a continuous check that this "Frame Monitor" function of all modules is still operating correctly, the start bit has been made distinguishable from both "1" and "0". The "Boolean" value of the start bit for the wired-OR function of the data line lies between "0" and "1". That is: "1"+"start"="1"; "start"+"0"="start" To achieve this distinction, the VMS-bus clock signal has been given four transitions per bit, with the transitions named as in FIG. 1b. The C1-S1 interval is guaranteed to be a certain amount longer than the C2-S2 interval. This difference provides the basis for the phase discrimination function which every module must carry out in order to maintain proper bit synchronization.

FIG. 1b shows the signal for the backplane; the Extended signals are similar. Data output is changed on the C1 and C2 transitions, input is sampled at S1 and S2.

ADVANTAGES OF VMS

The system so described has various attractive features and advantages, such as:
- an addressing range of 1023 Data Senders (input) and 1023 Data Receivers (output). This range is adequate for a large I/O system, and still allows a large number of addresses to be reserved for other types of transfers-such as status and control messages, broadcasts, self-identification messages, and messages containing internal reprogramming information for the I/O modules.
- it is extendable to multiple racks (up to 32); hence the extensive logical address space is matched by a liberal geographic allowance. In addition, the serial nature of the bus and the high quality of the Extended bus make it suitable as backbone of a distributed I/O system.
- it requires only a simple backplane and relatively simple and cheap interfacing logic, so that low-cost I/O is feasible.
- the frame length is variable and relatively short (a maximum of 32 data bytes); convenient for the quick access and short transfers needed in an I/O system. Even for very short transfers, the overhead is not prohibitive: 33 bits.
- the distributed arbitration scheme allows a high degree of autonomy, even for simple I/O modules.

Becoming bus master for the duration of a frame is simple, entails no risk of collisions, and loses no time for the passing of tokens. Thus, for instance, input boards designed to detect a change-of-state at their inputs, can simply pass this information on to the CPU on their own initiative rather than placing an interrupt request with the CPU or patiently waiting to be polled.

another handy feature is the concept of a "read frame": a CPU can start a frame to poll an input board, and the input board can provide its data in the data field of the same frame. The traditional and time-consuming procedure of a request frame from the CPU followed by an answer frame with data from the input board can thus be avoided.

DISADVANTAGES OF VMS

Upon further investigation, also various disadvantages emerge:

the bidirectional character of the data line is ill-suited for implementation as optical fiber;

the clock phase discriminator required on each module to maintain proper bit synchronization increases the complexity of the I/O boards.

the current LSI support for the VMS-bus is in the form of a set of two special integrated circuits that are exclusively manufactured by Signetics Corporation: one (SCB 68173) for the frame protocol and one (SCB 68171) for the clock phase discrimination. This makes VMS-bus applications particularly vulnerable to the supply policy of the IC manufacturers: each board-level product is dependent on the continuity of both (single-sourced) IC's.

in a single-backplane configuration, the bus timing is very tight, requiring high-speed, high-current drivers. The electromagnetic interference emission level of such drivers may well conflict with increasingly stringent EMC standards.

On the Extended VMS-bus, the bit time is approximately equal to 20 times the one-way traveling time. In contradistinction, for the protocol and arbitration mechanism the theoretical bit time would need to be no higher than twice the one-way traveling time. This "waste" of transmission capacity is particularly painful in view of the fact that even the theoretical maximum bit rate is a factor of 10 or more slower than the bit rate possible with protocols involving collision detection or token passing.

the provisions on the extended bus for ensuring data integrity and detecting transmission errors are minimal. Even though the RS-485 standard followed on the extended bus is highly immune to electromagnetic interference, the rudimentary nature of the checks on the data integrity is tantamount to blind faith in the effectiveness of whatever measures are taken to provide noise immunity on the bus. And the bidirectional nature of the EXTDAT line makes it difficult or impossible to apply fiber-optic techniques and thus obtain optimal noise immunity.

for a data transfer to or from a 16-bit I/O board, the 33-bit overhead represents an effective loss of ⅔ of the possible data rate. In traditional I/O systems, the customary parallel bus was fast enough for any conceivable I/O transfer. A serial bus, however, introduces the possibility that the transfer rate may not be fast enough for some applications. A speed loss by a factor of three implies a significant increase in the percentage of I/O applications that cannot be served by the VMS-bus.

for some other applications, in contrast, it is not so much speed but rather the ability to guarantee access within a maximum time that is important. In other words, individual starvation must be prevented. The priority mechanism of the VMS-bus fails to achieve this goal, even if the implementation suggested in the official specification is followed.

SUMMARY OF THE INVENTION

Among other things, it is an object of the invention to remove the above drawbacks without losing any of the favorable features by some relatively small—but far—reaching—changes with respect to the official VMS-bus specification, together with some additional rules on top of the specification: in particular, the transmission speed is raised by a factor of about ten.

According to one of its aspects the invention realizes the above objects, in that it provides a communication bus system comprising a first bilevel unidirectional medium element or wire, and a second bilevel unidirectional medium element or wire, and comprising an echo buffer station having retransmitting means for feeding the first wire with a selfclocked bivalent information packet, and comprising at least one peripheral station having clock extraction means for extracting a clock pulse from said information packet for under control of said clock pulse interrogating said information packet with respect to its value, and transmission means for after said interrogating providing said second wire with a self-determined nonselfclocked binary information value, said second wire having a wired logic functionality for under control of any binary information value received presenting an aggregated binary information value, said echo buffer station having delay means for, with a predetermined delay with respect to said feeding that is longer than a maximum intended transmission time for said information packet from said echo buffer station and any said binary information value to said echobuffer station combined, interrogating the then prevailing binary information value for copying thereof on a next succeeding selfclocked bivalent information packet.

The invention also relates to an echo buffer station, to a peripheral station, to a bridge element, and to an access module for use in the above communication system.

Further advantageous aspects of the invention are recited in various dependent claims.

BRIEF DESCRIPTION OF THE FIGURES

The invention will now be explained in detail with respect to the accompanying Figures, wherein:

FIG. 1a shows the normal frame shape of the VMS-bus;

FIG. 1b shows VMS-bus clock and data signals, both of which Figures have been explained supra;

FIG. 2 shows a modified frame shape for use with to the invention;

FIG. 3 shows a modified clock/data signal for use with the invention;

FIGS. 4a, 4b show a single-board and a sixteen-board configuration in a single frame, respectively;

ORGANIZATION DESCRIPTION

Figures 5, 6:
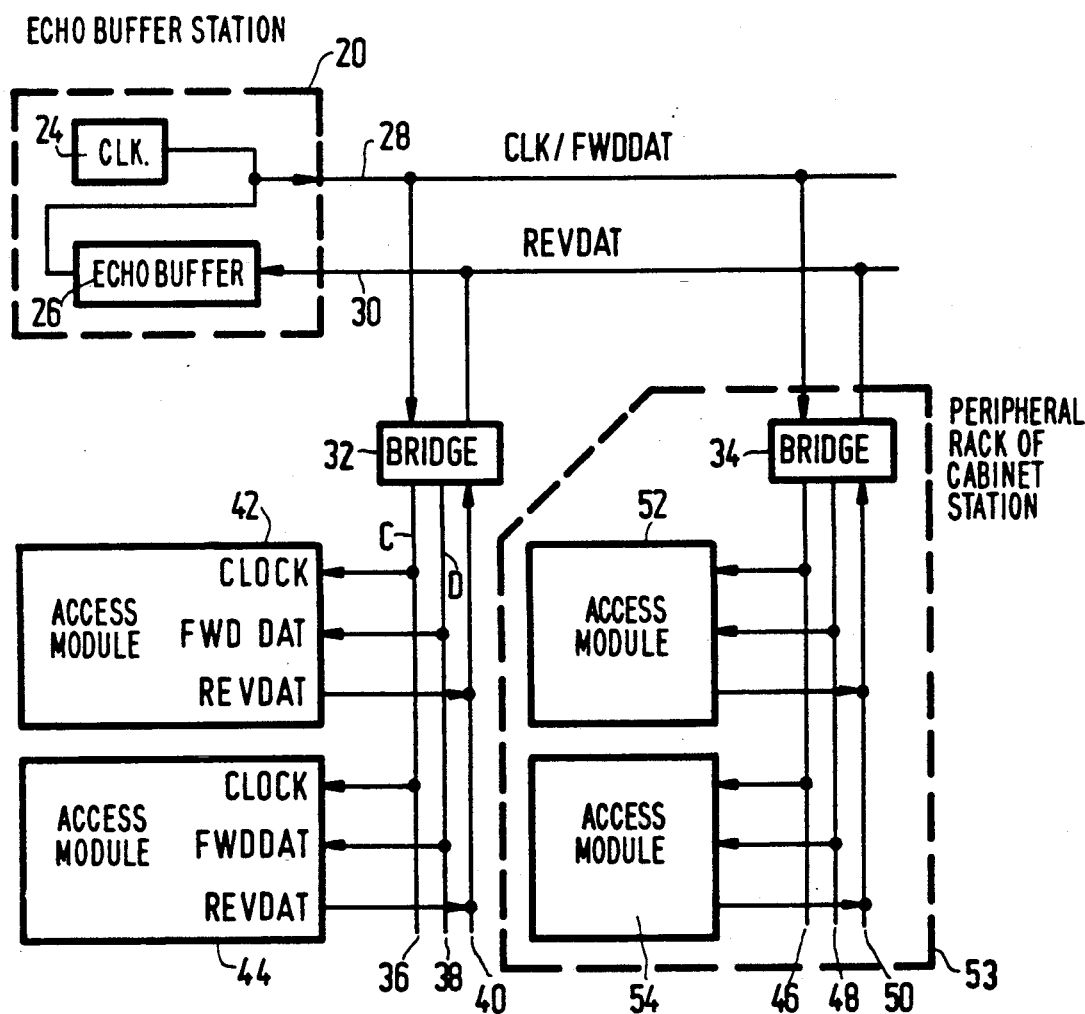
FIG. 5 shows a transmission sequence among six modules at three priority levels.
FIG. 6 is a system block diagram in accordance with the invention.

First, hereinafter, a set of organizational changes with respect to the VMS-system is described, for particularly advantageous use with the invention. Now, first a few bits are added to the frame in order to make detection of incidental transmission errors possible, and a few rules added to the behaviour requirements of modules in order to ensure that no module will embark on an erroneous course of action due to an incidental transmission error. These rules will also ensure that the entire I/O system remains consistent, even if the transmission error reaches only part of the system. That is, if some module detects a transmission error and rejects a frame, all other modules, including the ones that have not detected any transmission errors, should become aware of this rejection.

This explicit statement of self-evident truths is made necessary by the unique nature of the VMS-bus. Different parts of a single frame may be contributed by different modules. The header of the "Header Sender", the type code and data and part of the status by the "Data Sender", the remainder of the status by the "Data Receiver". As a consequence, no module knows in advance what the complete frame will look like, and no module is able to calculate the value of the parity bit that is appropriate for a correct frame.

Now, as a change, parity bits are added in the two places shown in FIG. 2, and the original single jam bit is doubled. The constituting of the frame is preferably assigned to a particular peripheral station. In a practical configuration this could well be a central processing unit, the term peripheral station then indicating only a distinction with respect to the common echo buffer station. This central processing unit generates both the header item and the type item (and type parity). Data, of course, may be generated by any peripheral station taking part in the communication. Now, whenever a peripheral station or a module which is an active participant in a frame is certain that it has detected a transmission error, it generates a jam sequence and so causes all modules to reject the frame and if necessary to re-establish frame synchronization. It has been found that the doubling of the jam bit avoids many error categories.

When a general-purpose recovery procedure for transmission errors such as above is introduced, and when at the same time random sequences of ones and zeroes between frames (which are allowed in the original VMS-bus specification) are prohibited, there is no longer a requirement for a separate detection of a false start bit. Hence there is no longer a requirement for a unique start bit. The complicated clock signal with a "long" and a "short" pulse may be changed back to a traditional clock; and the unique start bit may be replaced by a start code consisting of "normal" ones and zeroes. A code rather than a single "1" is required in order to provide immunity from transmission errors and to correctly handle in jam sequence: see FIG. 3, wherein data output is changed on the C transition and input is sampled on the S transition. The data signal shows an example of a possible start code.

As a consequence of these changes the following is achieved:

individual modules no longer require a clock phase discriminator.

interfacing to the bus only requires a single special IC, instead of two, reducing sensitivity manufacturers' supply policy and lowering the threshold for application-oriented designers to decide on their own ASIC approach (application-specific-integrated-circuit).

in a single-backplane configuration, the bus timing may be relaxed while maintaining the same bit rate or even increasing the bit rate somewhat. Thus, some slope-control can be introduced to reduce the emission level of interference, and/or the relaxed timing can be passed on to the modules in order to ease ASIC design.

on the Extended bus a bit time very close to the minimum of twice the one-way traveling time may be achieved; a safety factor of 2 thereabove would result in a very good safety margin; a few tens of percents would be good enough; (even substantial equality is often practical). In each of these three cases the bit rate would greatly exceed that of prior art (in the same configuration).

the quality of the transmission medium may now be monitored continuously. However, since system consistency can only be guaranteed for single-bit errors, the quality of the transmission medium must still be high enough to make the probability of multiple-bit errors insignificantly small. Data integrity is ensured under these conditions.

ADDITIONAL RULES

For the reduction of the overhead penalty in data transmissions involving very small numbers of bits per module, the principle of "slotted response" may be introduced. The data field of a frame is divided into a number of slots. From the header and type code information, generated by the central processing unit in a variable or in an invariant format, any peripheral station or access module may calculate whether it is selected to participate in the current frame, and if so, where within the data field it can find its slot. For example, the type information may specify the number of slots and every access module has assigned a particular slot number. In a single-slot frame, the module must wait until it is addressed specifically. Now, when its allocated slot passes, the module deposits data in it or draws data out of it. If the data field of a frame is assigned the maximum size of 32 bytes, sixteen 16-bit modules may participate in this frame and the effective data rate is increased from 30% to approximately 87%. See FIGS. 4a, 4b, FIG. 4a shows the data efficiency for a single I/O-board per frame as 16/53=30%. FIG. 4b shows the gain in efficiency through "slotted response" for the case sixteen I/O-boards in one frame as being 16×16/293=87%. Herein, the header is assumed to be equipped with a 3-bit start code; type code includes a parity bit; trailer (TR) consists of parity bit, status field and two jam bits.

For the prevention of individual starvation, the following rule is formulated: any module that has just succeeded in winning an arbitration round does not attempt to start a new frame until it has detected the occurrence of a frame of lower priority, or until it has detected that the bus has been idle. As a consequence of this rule, all of the modules at a particular priority level, assumed to be fixed, take turns. During each round of turns at a particular priority level, room is made available for one frame with a lower priority. All modules at this lower priority level also take turns, and also leave room for one module with a still lower priority. This continues until all modules have had at least one turn. Modules with a higher priority will have had more turns than those at a lower level; the access time for each module is deterministic and exponentially dependent on priority level.

As an example, consider five boards with addresses 5, 4, 3, 2, 1 and respective priority levels 2, 2, 1, 1, 0. Assume all of the boards want to transmit data continually. The sequence in which they gain access to the bus under the above rule, and the division of the bus transmission capacity among the various modules, is shown in FIG. 5. This illustrates the guaranteed throughput principle. The symbol "—" indicates that no module at that priority level is entitled to gain access to the bus. The symbol "—*" indicates that there is no module at all entitled to gain access to the bus. Hence the bus is idle.

DESCRIPTION OF A PREFERRED EMBODIMENT

FIG. 6 is a block diagram of a communication system according to the invention. The backbone of the system is a two-wire extended serial bus 28/30. The unidirectional bus wire 28 carries the combined clock and forward data signals, the unidirectional bus wire 30 carries the reverse data signals. Unidirectional in this context signifies that the bus wire in question either has one single transmitter station, or has one single receiver station. The two wires taken in combination of course allow for both a plurality of transmitter stations and for a plurality of receiver stations. The bus is on the one hand attached to a functionally passive echo buffer station 20. On the other hand, it is connected to peripheral rack or cabinet stations of which one has been indicated as station or black box 53. Furthermore, such rack or cabinet stations may be subdivided into physically separate access modules 42, 44, 52, 54. The black box interface to the serial extended bus is represented by bridge elements 32, 34. Within the rack or cabinet stations the interconnection means is three-wire-serial. Therein, wires 36, 46 carry the clock signals, 38 and 48 carry the forward data signals. The combined information of a wire pair 36/38 or 46/48 thus conforms to the signals presented on wire 28 to the associated bridge element 32, 34.

Finally, wires 40, 50 carry the reverse data. The reverse data presented by the respective cabinet or rack stations via their bridge elements 32, 34 combine to the reverse data on bus wire 30, as will be explained hereinafter. Inside echo buffer station 20, echo buffer 26 receives the respective signal components on wire 30. An output of it, likewise, feeds wire 28. Clock element 24, in parallel with element 26, also feeds bus wire 28. It should be noted that the representation of the echo buffer station has been made function-wise and not circuitry-wise, which will be detailed with respect to FIG. 8, infra.

The set-up as shown is arbitrary with respect to the number of rack or cabinet stations or the number of access modules within any such station. In particular, the access stations may be work stations, measuring stations and other stations that require intermodule communication service. They may have local data processing/data storage/data presentation facilities to any degree of sophistication as required. In principle, one or more of such access modules may function as interface to a further intercommunication bus system. Furthermore, several access modules as a subset may function in combination to fulfill the transmission requirements for a single user function such as a robot or complicated measuring apparatus.

Figure 7:
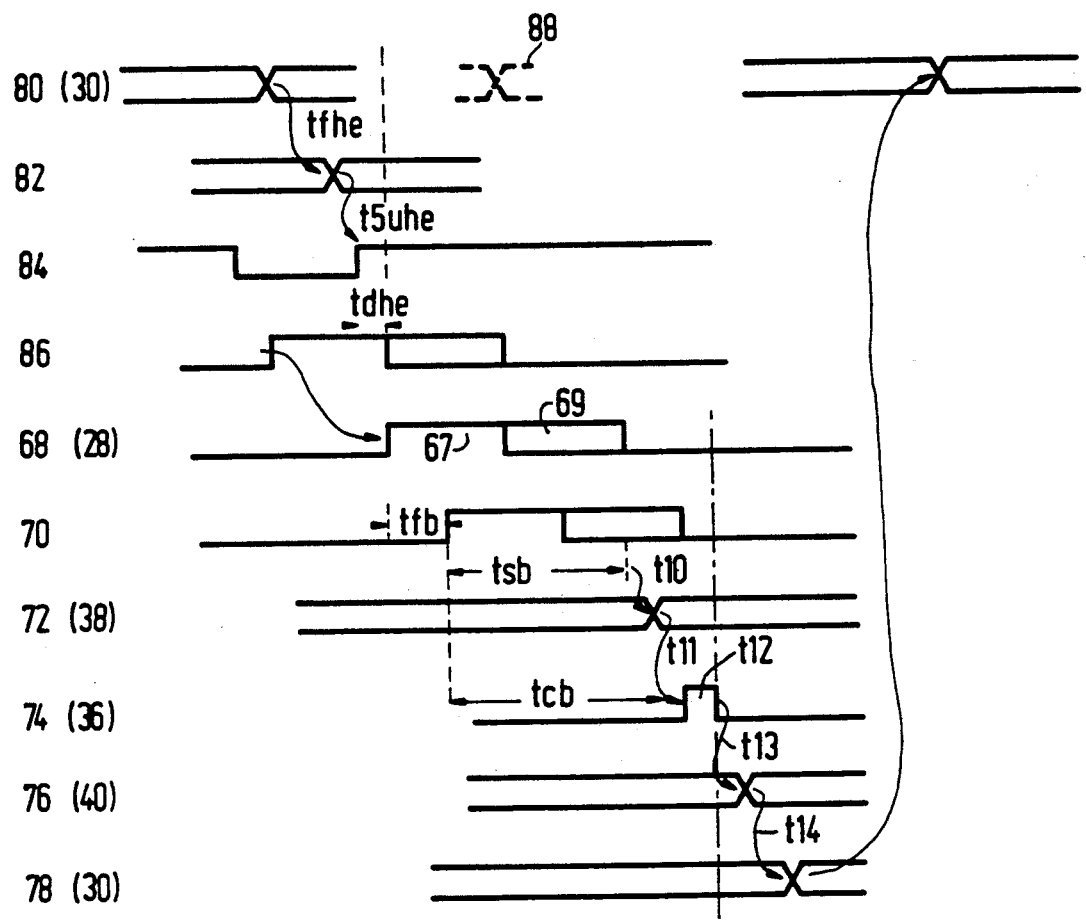
FIG. 7 is a timing diagram of the various signals occurring in such a system.

FIG. 7 is a timing diagram of various signals that occur in the system of FIG. 6; herein, it is assumed that the actual communication is one-to-one or one-to-many; any arbitration or signal composition of signals emanating from plural sources are ignored. In the various traces, trace 68 indicates the signal shape of a particular bit arriving on wire 28 at one of the bridge elements. In the embodiment, bus wires 30, 40, 50 allow for realizing a wired-OR-function on traces 76, 78, 80, that is, any signal source producing an active, one, or high signalization would obscure any coincident passive, zero, or low signalization by any or all other signal sources on the same wire. In principle, the serial extended bus 28/30 may be realized in optical fibre technology or in galvanic wire technology; the same applies to the three-wire serial buses 36/38/40 and 46/48/50, although the best mode contemplated herein is galvanic wire. The realization of wired-OR in optics is conventional, inasmuch as any light produced would existentially terminate darkness; in galvanics, wired-ORing may be done by cathode follower means and other conventional electronic circuitry. In realization by galvanic wiring, of course signal levels may be inverted, in combination with the change-over from a wired-OR to a wired-AND configuration. By itself, such change-over is conventional.

Now trace 68 is normally low, or off. The information part thereon consists of two parts 67, 69. Part 67 is high to represent a synchronizing rising edge at its beginning. For a logic —zero—, part 69 is low, there by realizing a falling edge between parts 67, 69. For a logic —one—, part 69 is high, thereby realizing a falling edge at its near end. For the moment, the origin of the information contained in this bit cell is ignored.

Now, the bridge element in question may contain an internal delay tfb, causing a delayed, but otherwise unchanged version 70 of original trace 68 to be available internally. The bridge element may comprise a galvanic separation element, realized, for example by a transformer, or an optical coupling with electrical-to-optical and optical to electrical conversion. The delay in question is caused by a filter function to mitigate against spikes and the like. In certain applications, notably when the input signal is optical, no filter is necessary, but only optical-to-electrical conversion. In addition to the above, upon the leading edge of the post-filter signal, a fixed delay tsb is started for optimum discrimination between the two possible information contents of the bit cell. After a small delay t10 this translates (trace 72) into an updated data value on data wire 38, 48. After a somewhat longer delay a clock pulse (trace 74) is produced on clock wire 36, 46, with a length of t12. At the beginning of this clock pulse, the access modules may ingest the "old" data bit received on line 38, 48. At the end of the clock pulse in question, the "old" data bit is considered terminated and a brief interval later (t13) as shown on trace 76 the access module(s) in question may produce an updated data bit on lines 40, 50, as the case may be. The latter updated data bit is received at the rear input of the bridge element in question. Note that the value of the data bit produced by the access module is unrelated bit-by-bit to the value of the most recently received data bit, apart from higher level organization considerations.

Again another brief interval t14 later, the signal change is transmitted to reverse data wire 30 on the front output of the bridge element (78). The extended serial bus 28/30 may be quite long and the propagation delay back to the echo buffer station may amount to 5 ns/meter bus length. Aside from the inaccuracy and variability of the latter indication, the geometrical distance from the peripheral stations to the echo buffer station may vary quite much (trace 80). Any signal change on line 30 will, after some filtering delay, become interrogatable within echo buffer station 20 as shown on trace 82. Trace 84 shows an example of the internal operation of echo buffer station 20: this is the clock pulse. The clock pulse, generated by clock element 24, is shown to produce or trace 86 the bit cell shape discussed earlier. If the rising edge (rear edge) of the clock pulse is at least an interval of t5uhe later than the transition on trace 82, this transition will be copied in the forward data cell, which translates in the present or absent transition after an interval tdhe on trace 86. The latter transition (or absence of it) completes the bit cell, whereof the signal is transferred to the respective bridges (trace 68) after a comparatively long interval. At that instance the cycle may recommence. Shortly after the information-governed transition on trace 86, a further data transition on trace 80 would be harmless.

The recurrency of the clock (trace 84) should be such that the longest delay for the return of a reverse signal should occur before the rising clock edge (inclusive of the tolerance delay t5uhe). If necessary, the clock frequency should be adjusted to attain the result.

DESCRIPTION OF VARIOUS SUBSYSTEMS

Figure 8:
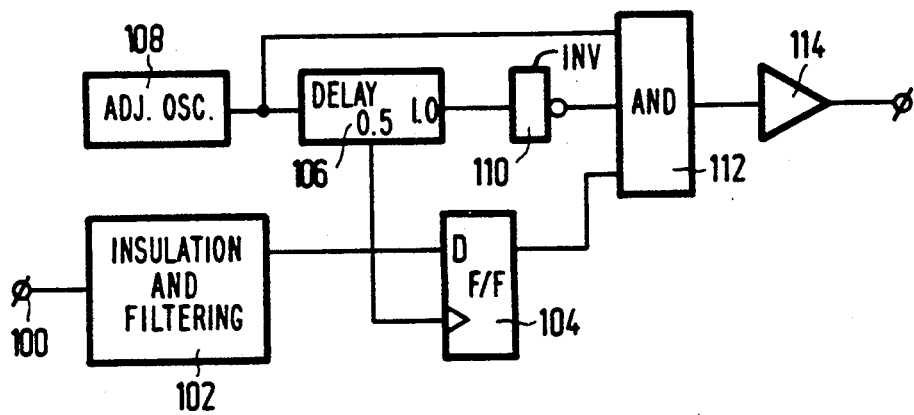
FIG. 8 is a block diagram of an echo buffer station for use with the invention.
Figure 8A:
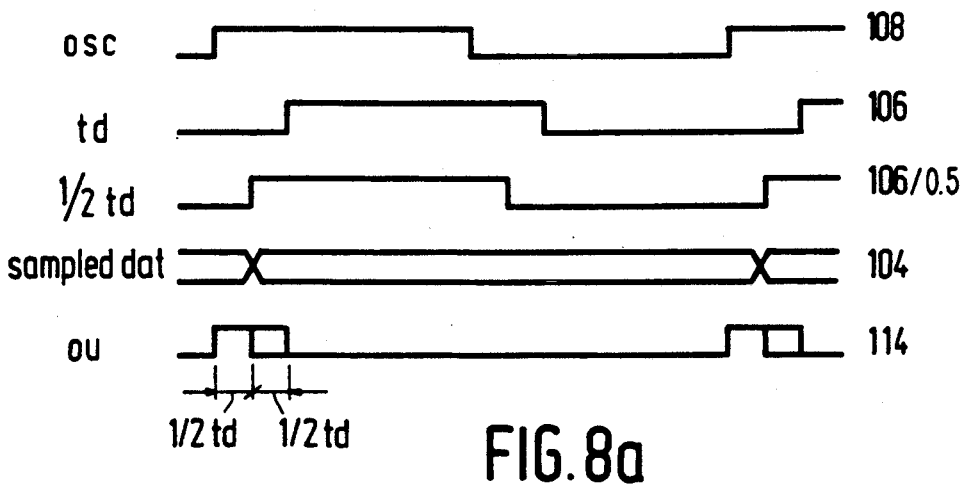
FIG. 8a shows time traces associated with FIG. 8.

FIG. 8 is a block diagram of an echo buffer station for use in the set-up of FIG. 6. The reverse data enters on input 100. Block 102 represents galvanic insulation and filtering if applicable. The output thereof feeds data flipflop 104, which samples under control of a signal from the midtap of delay 106. The delay is fed by adjustable oscillator 108. Direct output of oscillator 108, the sampled data from flipflop 104, and the inverted output from delay 106 (inversion element 110) are ANDed in gate 112. Element 114 is an output buffer for fanout reasons. FIG. 8a shows the associated time traces (in fact, an abstract from FIG. 7): oscillator (108), delay output (106), midtap (106/0.5), sampled data (104) and output data (114).

Figure 9:
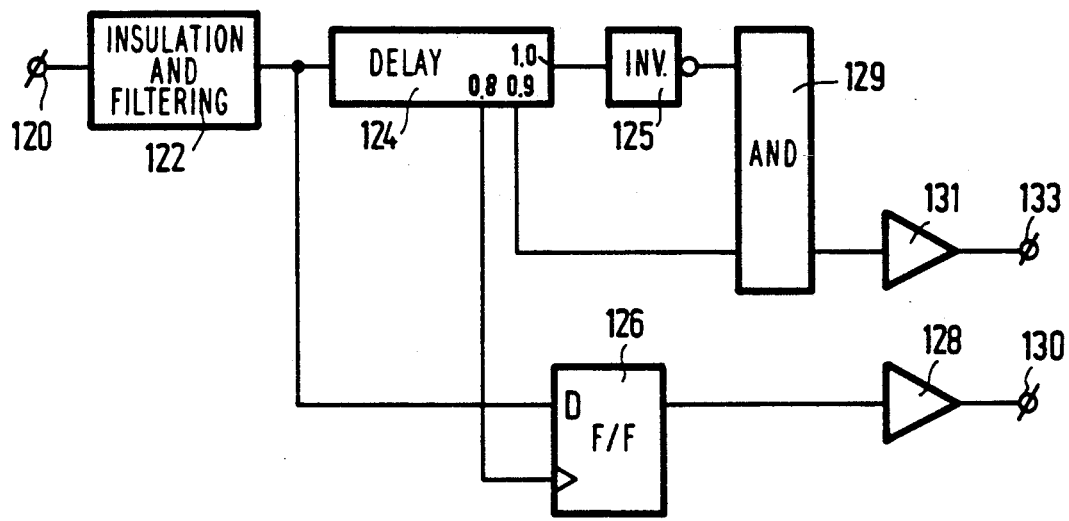
FIG. 9 shows forward circuitry for a bridge element.
Figure 9A:
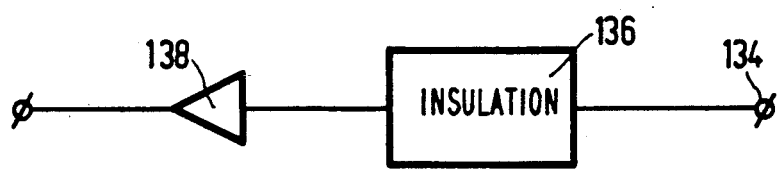
FIG. 9a shows backward circuitry therefor.
Figure 9B:
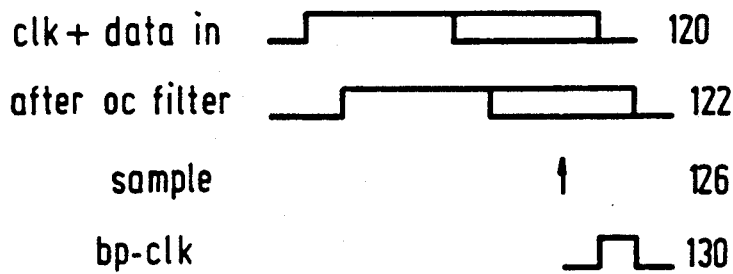
FIG. 9b shows time traces associated with FIGS. 9a and 9b.

FIGS. 9, 9a, 9b show circuitry and associated time traces for a bridge element, respectively. Input 120 receives clock and forward data. Element 122 is the galvanic insulation and filtering, if applicable. Element 124 is a delay element with triple outputs 124/0.8, 124/0.9 and 124/1.0, the post-scripts indicating the respective fractional delays associated therewith. The first output controls sampling of the output signal of block 122. The sample is stored in flipflop 126 and buffered by backplane driver 128 before going to output line 130 (38, 48). Outputs 124/0.9 and 124/1.0, the latter one via an inversion 125, are ANDed in gate 129 and amplified in backplane driver 131 before going to output 133 (36, 46). The reverse backplane signal on connection 134 feeds galvanic insulation 136 and extended bus driver 138. In FIG. 9b, trace 120 is the clock and data signal, trace 122 is after the front end delay introduced by the insulation and filtering, trace 126 indicates the sample instant, trace 130 is the backplane clock.

Figure 10:
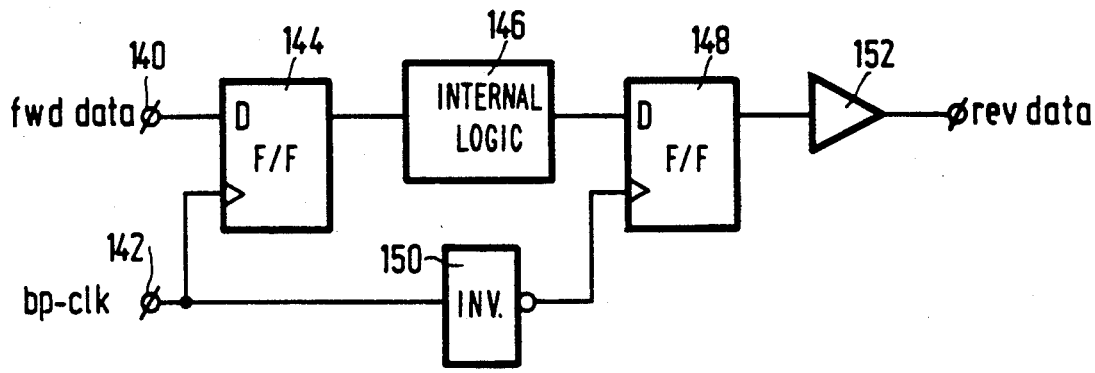
FIG. 10 shows access module circuitry.
Figure 10A:
FIG. 10a shows time traces associated with FIG. 10.
Figure 10A:
Figure 10A:
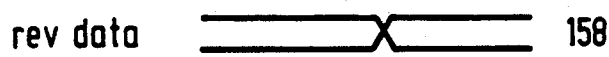

FIGS. 10, 10a show access module circuitry and associated time traces therefor, respectively. The forward data 140 is sampled in data flipflop 144 under control of backplane clock signal 142. The content of data flipflop 144 is used for an unspecified purpose in internal logic 146 of the access module in question, and the output result is sampled in flipflop 148 under control of the inverted backplane clock (inverter 150). Finally, driver 152 has been provided. In FIG. 10a, trace 154 shows the backplane clock, trace 156 the forward data, and trace 158 the reverse data. The data content is application-determined and no specifics have been given.

The subsystem description, supra, has been limited to the bit level; for brevity, no higher-level provisions were given. As to the echo buffer station, bridge station and access modules in general, these provisions are not relevant for the transmission organization proper and fall outside the scope of the present invention. In case of the slotted response organization, each peripheral station or access module in question comprises slot counting means that is loaded by the type item and which, by counting, indicates whether the slot in question is intended for the peripheral station or access module in question, or not. As regards the station that controls the message format, the header and type items may be read from an addressable memory, and a counting mechanism with respect to data received will in case of a multi-source message directly indicate the origin of the data item in question. The final position of this counting mechanism will activate the frame termination item TR in FIGS. 4a, 4b.

I claim:

1. A communication bus system comprising a first bilevel unidirectional medium, and a second bilevel unidirectional medium, and comprising an echo buffer station having retransmitting means for feeding the first bilevel unidirectional medium with a current packet of selfclocked bilevel information, and comprising at least one peripheral station having clock extraction means for extracting a clock pulse from said current packet of selfclocked bilevel information and for, in response to said clock pulse, interrogating said current packet to absorb a currently presented binary information value therefrom, and transmission means for, after said interrogating, providing the second bilevel unidirectional medium with a self-determined nonselfclocked binary information value, said second medium having a logic functionality such that, in response to all binary information values contemporaneously received by said second medium, it presents an aggregated binary information value to said echo buffer station, said echo buffer station having delay means for interrogating, after a predetermined delay with respect to said feeding that is longer than a maximum intended transmission time from said echo buffer station to any peripheral station and from any peripheral station to said echo buffer station, combined, the binary information value presented by said second medium for copying thereof by said retransmitting means on a next succeeding packet of selfclocked bilevel information.

2. A communication bus system as claimed in claim 1, wherein said predetermined delay is less than two times said maximum intended transmission time.

3. A communication bus system as claimed in claim 1, wherein said predetermined delay is substantially equal to said maximum intended transmission time.

4. A communication bus system as claimed in claim 1, wherein said selfclocked information packet is a bitwise element of a sequence of such elements, together comprising a header information, a type information, a type parity information, a data information, a data parity information, a status information, and a pair of jam bit cells.

5. A communication bus system as claimed in claim 1, wherein there are at least two peripheral stations, at least one thereof comprising frame indicating means for initiating a frame by means of a header and a type information, the latter indicating a succession of message slots each assignable to a particular peripheral station or to an access module within the latter peripheral station.

6. A communication bus system as claimed in claim 1, wherein there are at least two peripheral stations, at least one thereof comprising at least two access modules connected to a bridge element which is directly connected to said first bilevel unidirectional medium and said second bilevel unidirectional medium, said bridge element having said clock extraction means for extracting said clock pulse from said current packet of selfclocked bilevel information, for then outputting a secondary clock pulse on a first wire, a packet of nonselfclocked binary information on a second wire, said first and second wires feeding all access modules connected to the bridge element, the latter access modules feeding the bridge element with a third wire for realizing a further logic functionality feeding the bridge element by their respective particular binary information values for forwarding to said second medium.

7. A communication bus system as claimed in claim 5, wherein each peripheral station comprises one or more access modules, each having its own transmission means, and further comprising means for preventing starvation of access of the transmission means of any access module to said second bilevel unidirectional medium, in that arbiter means are provided wherein each access module has its own priority number, and also priority number detection means fed by said first medium for detecting a currently prevailing priority number, and wherein any module that has just succeeded in winning an arbitration round does not attempt to present its own priority number until it has detected prevalence of a lower priority number than its own or an idle state on said first bilevel unidirectional medium.

8. An echo buffer station for use in a communication bus system having a first bilevel unidirectional medium for carrying a current packet of selfclocked binary information, and a second bilevel unidirectional medium, and at least one peripheral station having clock extraction means for extracting a clock pulse from said current packet of selfclocked bilevel information and for in response to said clock pulse interrogating said current packet to absorb a currently presented binary information value therefrom, and transmission means for, after said interrogating, providing said second bilevel unidirectional medium with a self-determined nonselfclocked binary information value, said second medium having a logic functionality such that, in response to all binary information values contemporaneously received by said second medium, it presents an aggregated binary information value to said echo buffer station, said echo buffer station comprising:

retransmitting means for feeding said first medium with said current packet of selfclocked bilevel information;

delay means for interrogating, after a predetermined delay with respect to said feeding that is longer than a maximum intended transmission time from said echo buffer station to any peripheral station and from any peripheral station to said echo buffer station, combined, the binary information value presented by said second medium for copying thereof on a next succeeding packet of selfclocked bilevel information, an adjustable oscillator element for generating recurrent interrogation pulses, an input fed by said second medium, a pulse shaper fed by said oscillator element and by said input and having pulse shape means for in response to an interrogation pulse producing said next succeeding packet of selfclocked bilevel information having at least a rising edge and a falling edge, and a temporal position of at least one of said rising and falling edges with respect to said interrogation pulse determining a binary information content of said next succeeding packet, for transmitting on said first medium by said retransmitting means.

9. An echo buffer station as claimed in claim 8, wherein said oscillator has adjusting means for adjusting said predetermined delay to a value substantially equal to said maximum intended transmission time.

10. A peripheral station for use in a communication bus system having a first bilevel unidirectional medium, and a second bilevel unidirectional medium, and an echo buffer station having retransmitting means for feeding the first medium with a current packet of selfclocked bilevel information, the second unidirectional bilevel medium having a logic functionality such that, in response to all binary information values contemporaneously received by said second medium, it presents an aggregated binary information value to said echo buffer station, said echo buffer station having delay means for interrogating, after a predetermined delay with respect to said feeding, a binary information value presented by said second medium for copying thereof on a next succeeding packet of selfclocked bilevel information, which predetermined delay is longer than a maximum intended transmission time from said echo buffer station to any peripheral station and from any peripheral station to said echo buffer station, combined, said peripheral station comprising:

an input fed by said first medium, edge detector means for in response to a standard edge of said current packet of selfclocked bilevel information interrogating an information-carrying data signal value in an interval of said packet and absorbing said data signal value, and thereupon producing a nonselfclocked output data signal on an output for transmission on said second medium.

11. A peripheral station as claimed in claim 10, further comprising a bridge station connected to said input fed by said first unidirectional bilevel medium and to said output feeding said second unidirectional bilevel medium, said bridge station feeding a first wire with an extracted clock signal derived from said edge detector means, and a second wire for data signal values interrogated from said current packet of selfclocked bilevel information, and being fed by a third wire for thereon receiving data corresponding to said nonselfclocked output signal for transmission on said second medium.

12. A peripheral station as claimed in claim 11, further comprising a plurality of access modules that are connected in parallel to said first, second and third wires.

13. A bridge element for use in a peripheral station which is for use in a communication bus system having a first bilevel unidirectional medium, and a second bilevel unidirectional medium, and an echo buffer station having retransmitting means for feeding the first bilevel unidirectional medium with a current packet of selfclocked bilevel information, said second bilevel unidirectional medium having a logic functionality such that, in response to all binary information values contemporaneously received by said second medium, it presents an aggregated binary information value to said echo buffer station, said echo buffer station having delay means for interrogating, after a predetermined delay with respect to said feeding, a binary information value presented by said second medium for copying thereof by said retransmitting means on a next succeeding packet of selfclocked bilevel information, which predetermined delay is longer than a maximum intended transmission time from said echo buffer station to any peripheral station and from any peripheral station to said echo buffer station, combined, said peripheral station having an input fed by said first medium, edge detector means for in response to a standard edge of said packet interrogating a data signal value in an interval of said current packet and absorbing said data signal value, and thereupon producing a nonselfclocked output signal on an output for transmission on said second medium, said bridge element having connections for said first medium and said second medium, for a first wire for clock signals derived by said edge detector means, for a fourth wire for data signal values interrogated, and for a third wire for receiving said nonselfclocked output data signal for transmission on said second medium.

14. An access module for use in a peripheral station which is for use in a communication bus system having a first bilevel unidirectional medium, and a second bilevel unidirectional medium, and an echo buffer station having retransmitting means for feeding the first bilevel unidirectional medium with a packet of selfclocked bilevel information, said second medium having a logic functionality such that, in response to all binary information values contemporaneously received by said second medium, it presents an aggregated binary information value to said echo buffer station, said echo buffer station having delay means for interrogating, after a predetermined delay with respect to said feeding, a binary information value presented by said second medium for copying thereof by said retransmitting means on a next succeeding packet of selfclocked bilevel information, which predetermined delay is longer than a maximum intended transmission time from said echo buffer station to any peripheral station and from any peripheral station to said echo buffer station, combined, said peripheral station having an input fed by said first medium, edge detector means for in response to a standard edge of said current packet interrogating a data signal value in an interval of said current packet and absorbing said data signal value, and thereupon producing a nonselfclocked output signal on an output for transmission on said second medium, said access module having a first wire connection for receiving a clock signal derived by said edge detector means, a third wire connection for receiving a data signal for interrogation of data signal values therefrom under control of said clock signal, and a third wire connection for a secondary data signal that changes after reception of said clock signal, said secondary signal being used in producing said nonselfclocked output signal for transmission on said second medium.

* * * * *